(12) United States Patent
Iijima et al.

(10) Patent No.: US 8,835,006 B2
(45) Date of Patent: Sep. 16, 2014

(54) CARBON NANOHORN CARRIED MATERIAL AND PROCESS FOR PRODUCING CARBON NANOTUBE

(75) Inventors: Sumio Iijima, Minato-ku (JP); Masako Yudasaka, Minato-ku (JP); Jin Miyawaki, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/484,916

(22) Filed: May 31, 2012

(65) Prior Publication Data

US 2012/0270051 A1    Oct. 25, 2012

Related U.S. Application Data (63) Continuation of application No. 12/223,168, filed as application No. PCT/JP2007/051438 on Jan. 30, 2007, now abandoned.

(30) Foreign Application Priority Data

Jan. 31, 2006  (JP) ................................. 2006-023800

(51) Int. Cl.
| | |
|---|---|
| *B32B 5/16* | (2006.01) |
| *B82Y 30/00* | (2011.01) |
| *B01J 37/02* | (2006.01) |
| *B01J 21/18* | (2006.01) |
| *B82Y 40/00* | (2011.01) |
| *C01B 31/02* | (2006.01) |
| *B01J 23/745* | (2006.01) |
| *B01J 23/42* | (2006.01) |
| *B01J 23/24* | (2006.01) |
| *B01J 23/74* | (2006.01) |

(52) U.S. Cl.
CPC ......... *C01B 31/0233* (2013.01); *C01P 2004/13* (2013.01); *C01B 2202/04* (2013.01); *B01J 37/0207* (2013.01); *C01B 2202/06* (2013.01); *B01J 23/42* (2013.01); *B01J 21/185* (2013.01); *B01J 23/24* (2013.01); *B82Y 40/00* (2013.01); *B82Y 30/00* (2013.01); *C01B 2202/02* (2013.01); *B01J 23/745* (2013.01); *B01J 23/74* (2013.01); *Y10S 977/773* (2013.01)
USPC .......................... 428/403; 423/447.1; 977/773

(58) Field of Classification Search
USPC ........ 423/447.1–447.3, 445 B; 977/742–754, 977/842–848; 428/367; 204/157.47; 427/249.1–249
See application file for complete search history.

(56) References Cited

U.S. PATENT DOCUMENTS

| | | |
|---|---|---|
| 8,007,908 B2 | 8/2011 | Iijima et al. |
| 8,084,505 B2 | 12/2011 | Yuga et al. |

(Continued)

FOREIGN PATENT DOCUMENTS

| | | |
|---|---|---|
| JP | 2001-064004 | 3/2001 |
| JP | 2003-277029 | 10/2003 |

(Continued)

OTHER PUBLICATIONS

Kokai, et al., Growth dynamics of single-wall carbon nanotubes and nanohorn aggregates by CO2 laser vaporization at room temperature, Applied Surface Science 2002; 197-198: 650-655.*

(Continued)

*Primary Examiner* — Daniel C McCracken
(74) *Attorney, Agent, or Firm* — Wenderoth, Lind & Ponack, L.L.P.

(57) ABSTRACT

A carbon nanohorn carried material for producing a carbon nanotube by a chemical vapor deposition (CVD) method, including a catalytic metal or a compound thereof contained inside carbon nanohorns or supported on exterior walls of the carbon nanohorns is provided. A carbon nanotube is produced by a CVD reaction using the carbon nanohorn carried material. A novel technical means for producing a carbon nanotube which does not use any noncarbon type carrier, can easily collect and purify the carbon nanotube and can control the length of the carbon nanotube can be provided.

1 Claim, 7 Drawing Sheets

(56) References Cited

U.S. PATENT DOCUMENTS

| | | |
|---|---|---|
| 2003/0124717 A1 | 7/2003 | Awano et al. |
| 2004/0241445 A1* | 12/2004 | Yudasaka et al. ............. 428/408 |
| 2006/0093545 A1 | 5/2006 | Maruyama et al. |
| 2007/0003471 A1 | 1/2007 | Kawabata |
| 2007/0027029 A1* | 2/2007 | Kasuya et al. ................ 502/180 |

FOREIGN PATENT DOCUMENTS

| | | |
|---|---|---|
| WO | 2004/087570 A1 | 10/2004 |
| WO | 2004/106234 A1 | 12/2004 |
| WO | 2004/108275 | 12/2004 |
| WO | WO 2004/108275 * | 12/2004 ............... B01J 21/18 |

OTHER PUBLICATIONS

Chen, et al., Review of the High-Temeperature Oxidation of Iron and Carbon Steels in Air or Oxygen, Oxidation of Metals 2003; 59(5/6): 433-468.*

International Search Report mailed Mar. 27, 2007 in International (PCT) Application No. PCT/JP2007/051438.

S. Bandow et al., "Raman scattering study of double-wall carbon nanotubes derived from the chains of fullerenes in single-wall carbon nanotubes", Chemical Physics Letters, vol. 337, pp. 48-54 (2001).

* cited by examiner

CARBON NANOHORN CARRIED MATERIAL AND PROCESS FOR PRODUCING CARBON NANOTUBE

This application is a continuation application of U.S. Application Ser. No. 12/223,168, filed Nov. 14, 2008, which is the national phase filing of International Patent Application No. PCT/JP2007/051438, filed Jan. 30, 2007.

TECHNICAL FIELD

The present invention relates to catalyst-carrying carbon nanohorns (NHs) capable of realizing a novel process for producing carbon nanotubes and to a process for producing a carbon nanohorn (NT) using the catalyst-carrying carbon nanohorns.

BACKGROUND ART

For the production of a carbon nanotube (NT) by a chemical vapor deposition (CVD) method, Si, $SiO_2$, MgO, $Al_2O_3$ or the like has been hitherto used as a carrier of a catalytic metal such as Fe, Ni, Co, Pt, W and Mo. As a carbon source, an organic gas, such as methane, ethane, acetylene, benzene or an alcohol, or a CO gas is used. Such a carbon source is heated at a high temperature in the presence of the above catalyst to produce a single walled carbon nanotube (SWNT) by a CVD reaction.

With the above conventional method, however, it is necessary to remove the catalyst carrier after the formation of the carbon nanotubes because the carrier is an inorganic substance other than carbon (see, for example, Patent Documents 1 and 2). Thus, a burden is imposed by the recovery and refinement of carbon nanotubes, which poses a serial problem in practical application.

In conventional CVD methods, there is also a problem because it is difficult to control the length of carbon nanotubes.

Patent Document 1: Published Japanese Translation of PCT International Application No. 2005-532976
Patent Document 1: Unexamined Japanese Patent Application Publication No. 2005-126323

SUMMARY OF THE INVENTION

With the foregoing background in view, it is an object of the present invention to solve the above described problems of the conventional technology and to provide a novel technical means for producing a carbon nanotube which does not use any noncarbon type carrier, can easily collect and purify the carbon nanotube and can control the length of the carbon nanotube.

As means for accomplishing the above object, the present invention has the following features.

First aspect: A carbon nanohorn carried material used for producing a carbon nanotube by a chemical vapor deposition method, characterized in that a catalytic metal for producing a carbon nanotube or a compound thereof is contained inside carbon nanohorns or supported on exterior walls of the carbon nanohorns.

Second aspect: The carbon nanohorn carried material as recited in the first aspect, wherein the catalytic metal or the compound thereof is one or two or more members selected from the group consisting of Fe, Ni, Co, Pt, Mo, W, Mg, alloys of these metals and compounds of these metals.

Third aspect: The carbon nanohorn carried material as recited in the second aspect, wherein the compound is in the form of an inorganic acid salt, an organic acid salt, a complex or an organometallic compound.

Fourth aspect: The carbon nanohorn carried material as recited in any one of the first to third aspects, wherein the carbon nanohorns have openings at least either side parts or top parts thereof.

Fifth aspect: A carbon nanohorn carried material used for producing a carbon nanotube by a chemical vapor deposition method, characterized in that a catalytic metal for producing a carbon nanotube or a compound thereof and a carbon source compound for producing a carbon nanotube are contained inside carbon nanohorns or supported on exterior walls of the carbon nanohorns.

Sixth aspect: The carbon nanohorn carried material as recited in the fifth aspect, wherein the catalytic metal or the compound thereof is one or two or more members selected from the group consisting of Fe, Ni, Co, Pt, Mo, W, Mg, alloys of these metals and compounds of these metals.

Seventh aspect: The carbon nanohorn carried material as recited in the sixth aspect, wherein the compound is in the form of an inorganic acid salt, an organic acid salt, a complex or an organometallic compound.

Eighth aspect: The carbon nanohorn carried material as recited in any one of the fifth to seventh aspects, wherein the carbon source compound is one or two or more of members selected from the group consisting of fullerenes, phthalocyanines and carbon compounds with a low vapor pressure.

Ninth aspect: The carbon nanohorn carried material as recited in any one of the fifth to eighth aspects, wherein the carbon nanohorns have openings at side parts or top parts thereof.

Tenth aspect: A process for producing a carbon nanotube, comprising subjecting a carbon source compound to a chemical vapor deposition reaction at a temperature in a range of 500 to 1,200° C. in an inert gas atmosphere or in a mixed gas atmosphere containing an inert gas and hydrogen in the presence of a carbon nanohorn carried material according to any one of the first to fourth aspects, so that the carbon nanotube is produced.

Eleventh aspect: A process for producing a carbon nanotube, comprising conducting a chemical vapor deposition reaction at a temperature in a range of 500 to 1,200° C. in an inert gas atmosphere or in a mixed gas atmosphere containing an inert gas and hydrogen in the presence of a carbon nanohorn carried material according to any one of the fifth to ninth aspects, so that the carbon nanotube is produced.

Twelfth aspect: The process for producing a carbon nanotube as recited in the eleventh aspect, wherein the chemical vapor deposition reaction is performed in the coexistence of a carbon source compound.

Thirteenth aspect: The process for producing a carbon nanotube as recited in eleventh or twelfth aspect, wherein a form of the carbon source compound contained inside the carbon nanohorns or supported on exterior walls of the carbon nanohorns is varied to control the length of the carbon nanotube produced.

Fourteenth aspect: The process for producing a carbon nanotube as recited in the thirteenth aspct, wherein the form of the carbon source compound is a solid.

Fifteenth aspect: The process for producing a carbon nanotube as recited in any one of the tenth to fourteenth aspects, wherein a kind of the catalytic metal or the compound thereof is varied to control the number of layers of the carbon nanotube produced.

BEST MODE FOR CARRYING OUT THE INVENTION

The features of the present invention are as described above. The embodiments of the invention will be next described.

The "carbon nanohorns" in the present invention are generally intended to include a "dahlia-like" aggregate of a plurality of horn-shaped bodies with their closed portions oriented outward, and an assembly of a plural groups each composed of a plurality of horn-shaped bodies.

The carbon nanohorns as defined above will be hereinafter called "NHs" (as a plural) for brevity. Such NHs may have openings at their side parts or top parts. Namely, each of one or more horn-shaped bodies from which NHs are formed may be provided with an opening.

Carbon nanohorns (NHs) to be used in the present invention may be obtained by methods developed by the present inventors or by other various methods. Methods developed by the present inventors in which oxygen is acted to NHs or other methods may be suitably used for forming the above-described openings.

Thus, carbon nanohorns (NHs) to be used in the present invention may be those which are obtained by the conventional methods or by various methods and which may have or may not have openings. Further, the carbon nanohorns (NHs) may contain a permissive range of functional group or groups bonded thereto.

A catalytic metal or a compound of the catalytic metal for producing a carbon nanotube (NT) may be carried on the carbon nanohorns (NHs) by adhesion thereof on exterior wall surfaces of each of the horn-shaped bodies constituting the carbon nanohorns (NHs), by inclusion thereof into the horn-shaped bodies through the openings, or by insertion thereof into interstices between the horn-shaped bodies.

As the catalytic metal, there may be used various kinds of metals such as those conventional metals that have been hitherto known to have capabilities of producing carbon nanotubes. Specific examples of the catalytic metal include Fe, Ni, Co, Pt, Mo, W, Mg and alloys thereof. The compound of the catalytic metal may be in any known form such as an inorganic acid salt, an organic acid salt, a complex or an organometallic compound.

The catalytic metal or compound thereof may be supported on the carbon nanohorns by various methods such as a vapor phase deposition and liquid phase adhesion or precipitation.

When a carbon source compound is carried on the carbon nanohorns together with the catalytic metal or compound thereof, the above-described method may be used similarly. As the carbon source compound, a carbonic compound having a relatively low vapor pressure, such as a fullerene, a phthalocyanine or a polycyclic hydrocarbon compound, may be suitably used.

The amount of the catalytic metal or compound thereof and the amount of the carbon source compound carried on the carbon nanohorns (NHs) may be determined in consideration of the reaction conditions of the CVD reaction and of the yield, length and shape of carbon nanotubes (NT) to be produced.

In carrying out the chemical vapor deposition (CVD method), the carbon nanohorn carried material supporting thereon the catalytic metal or compound thereof and, if desired, the carbon source compound may be used in the form of a layer scattered over a substrate or in the form of a bed fluidized by or moved through a gas.

When the carbon nanohorn carried material which does not carry the carbon source compound is used, the CVD reaction is carried out by feeding, a hydrocarbon compound such as methane, ethane, ethylene, acetylene or benzene, an alcohol such as methanol or ethanol, or CO, as the carbon source compound, to a reaction system containing the carbon nanohorn carried material. The reaction system is heated to a temperature of 500 to 1,200° C. in the atmosphere of an inert gas such as argon or nitrogen or of a mixed gas of the inert gas with hydrogen. When the carbon nanohorn carried material which carries the carbon source such as fullerenes is used, the reaction is performed without introducing the above-described hydrocarbon compound, alcohol, CO or the like.

In performing the CVD reaction, the amounts of the reactants may be properly selected in consideration of the conditions similar to those described above.

The reaction of the present invention can produce carbon nanotubes having a single walled or a multi-walled (two or more walls) structure depending upon the kind of the catalytic metal or compound thereof. This also applies to the diameter of the carbon nanotubes produced.

When the carbon nanohorn carried material which carries the carbon source compound such as fullerenes is used, carbon nanotubes having shorter lengths can be produced.

Description will be next made to examples for describing the invention in more detail. But these examples are not restrictive of the invention in any way.

Example 1

Graphite was subjected to $CO_2$ laser ablation at room temperature in a stream of Ar (760 Torr) to prepare NHs in accordance with the method described in Chem. Phys. Left., 1999, 309, 165. The obtained NHs were treated at 570 to 580° C. for 10 minutes in a stream of $O_2$ to obtain carbon nanohorns (NHox) having openings in accordance with the method described in Mol. Pharm., 2005, 2, 475.

Figure 1:
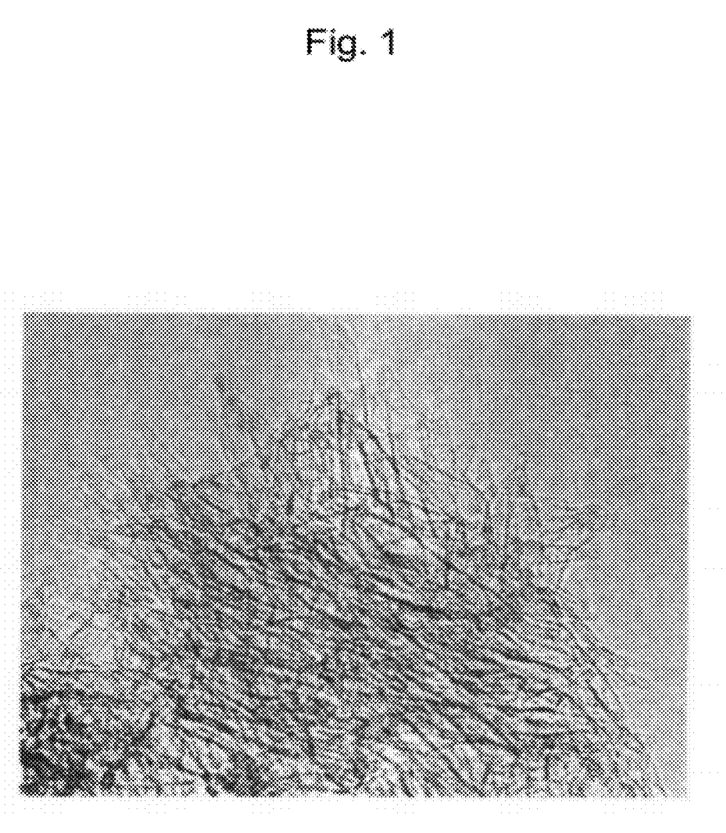
FIG. 1 is a TEM photograph (1 cm: 20 nm) of NHox containing therein iron acetate.

Next, 50 mg of iron acetate (manufactured by Sigma-Aldrich Inc.; purity: more than 99.995%) and 50 mg of the hole-opened nanohorns (NHox) were mixed with each other in 20 cm³ ethanol. The mixture was stirred at room temperature for 24 hours, filtered, washed with ethanol and dried to obtain iron acetate-carrying NHox having an iron content of 2 atomic %. The TEM photograph of the iron acetate-carrying NHox is shown in FIG. 1. The particles seen in NHox are those of the iron acetate.

The obtained iron acetate-carrying NHox was placed in a boat made of alumina and heated to 800° C. in a stream of a mixed gas of Ar and $H_2$ (Ar: 300 cm³/min, $H_2$: 100 cm³/min). After a temperature of 800° C. had been reached, the Ar and $H_2$ mixed gas stream was bubbled through ethanol and the resulting stream of a mixed gas containing Ar, $H_2$ and ethanol was fed to the reaction system in place of the Ar and $H_2$ mixed gas stream. The CVD was thus performed for 15 minutes. After the CVD, the ethanol bubbling was stopped and the reaction system was cooled to room temperature in the Ar and $H_2$ mixed gas stream to obtain single walled carbon nanotubes (SWNT). The TEM photograph of SWNT is shown in FIG. 2 and the Raman spectrum thereof is shown in FIG. 3.

Figure 2:
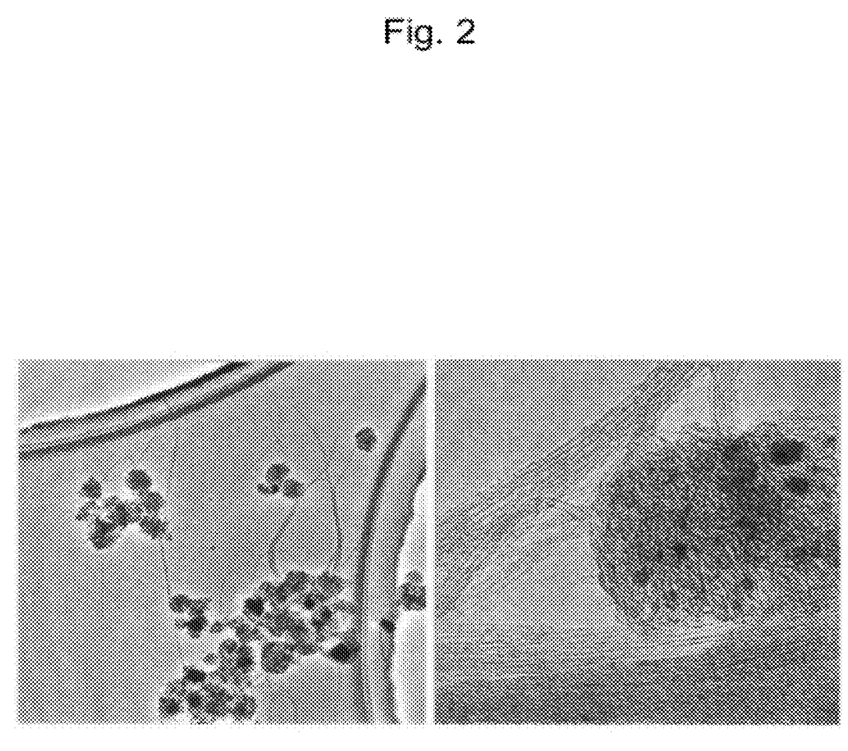
FIG. 2 is a TEM photograph (1 cm: 300 nm in the left-side drawing; 1 cm: 25 nm in the right-side drawing) of SWNT of Example 1.

In FIG. 2, SWNT, obtained by CVD at 800° C. using carbon nanohorns containing therein iron acetate, is seen in a fibrous form. The spherical substance is the hole-opened nanohorn. In the right-side enlarged view, the iron oxide particles attached to the hole-opened nanohorn are seen as black particles. The iron oxide was formed by alteration of iron acetate during the course of CVD.

Figure 3:
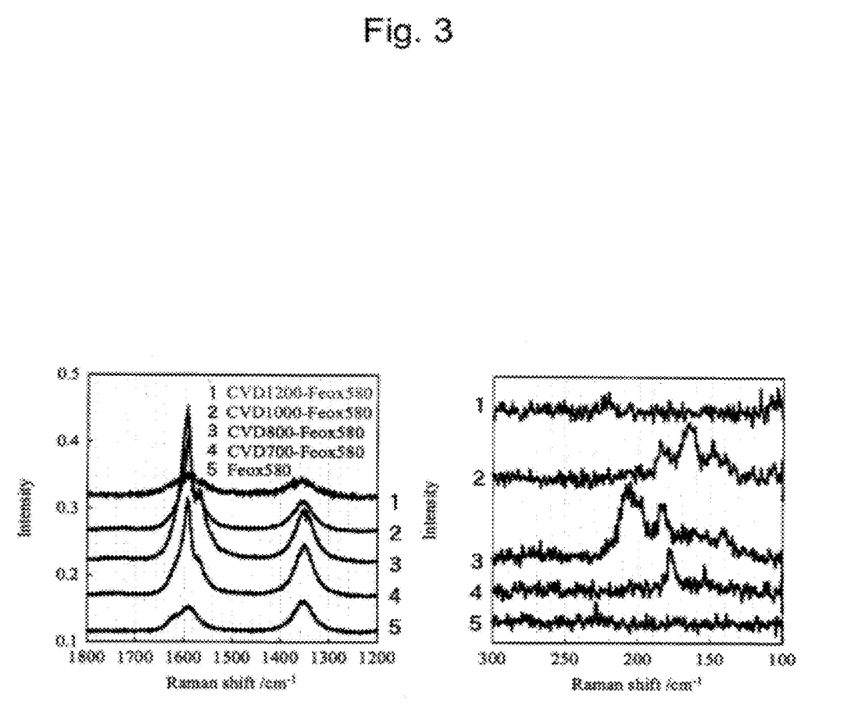
FIG. 3 is Raman spectra of SWNT of Example 1.

FIG. 3 shows the Raman spectra of SWNT obtained by CVD at various temperatures using the nanohorns containing therein iron acetate. The G and D bands inherent to NHox are seen at 1600 $cm^{-1}$ and 1,350 $cm^{-1}$, respectively. In the spectra of the samples after CVD, there are narrow G bands and shoulders in their low wave number sides, which are characteristic to SWNT. In addition, peaks are seen near 200 $cm^{-1}$. Such peaks are attributed to breathing mode of SWNT. The fact that the peak position of the breathing mode varies with the CVD temperature indicates that the diameter distribution of SWNT varies with the CVD temperature.

Example 2

Figure 4:
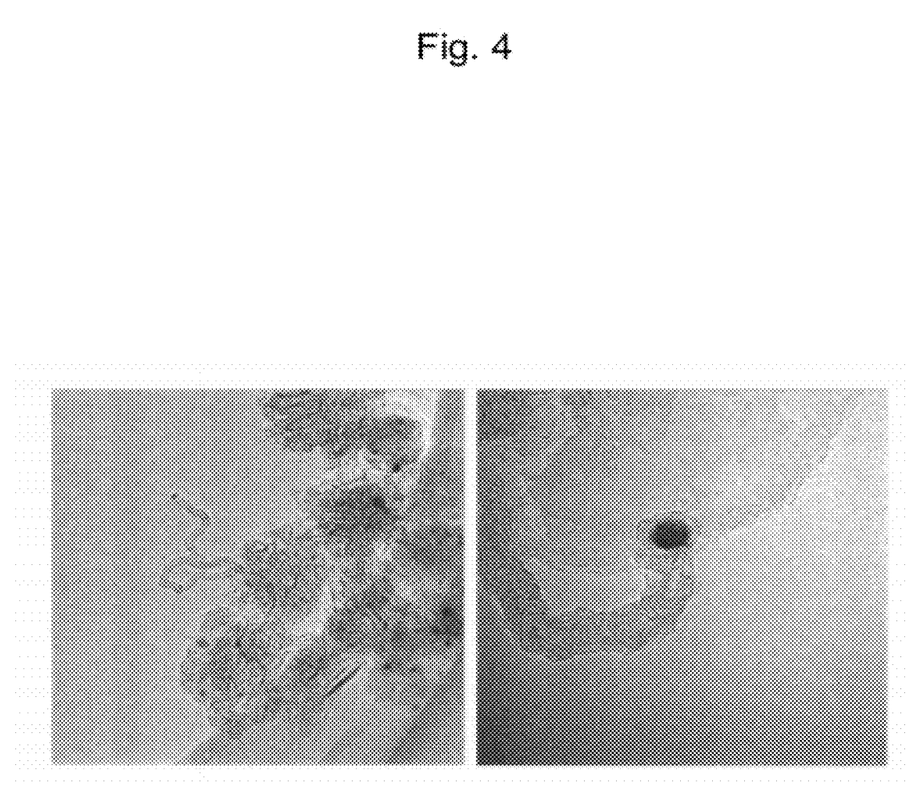
FIG. 4 is a TEM photograph (3 cm: 50 nm in the left-side drawing; 3 cm: 20 nm in the right-side drawing) of MWNT of Example 2.

The experiment of Example 1 was conducted in the same manner as described except that nickel acetate was used in place of the iron acetate used in Example 1. The TEM photograph of the obtained multi-walled carbon nanotube (MWNT) is shown in FIG. 4. The TEM photograph of MWNT, obtained by CVD at 800° C. using carbon nanohorns containing therein nickel acetate, is seen in the observed image. In the right-side enlarged view, nickel oxide particles attached to MWNT are seen as black particles. The nickel oxide was formed by alteration of nickel acetate during the course of CVD.

Example 3

Figure 5:
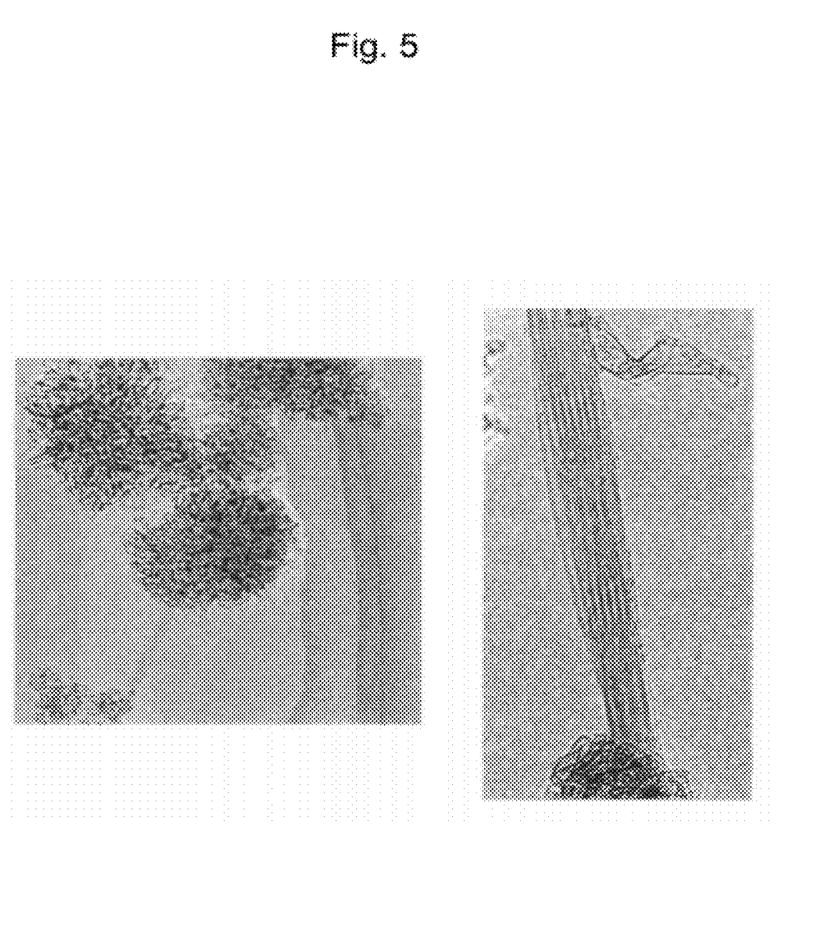
FIG. 5 is a TEM photograph (1 cm: 35 nm in the left-side drawing; 3 cm: 2 nm in the right-side drawing) of DWNT of Example 3.

The experiment of Example 1 was conducted in the same manner as described except that a mixture of cobalt acetate and molybdenum acetate (weight ratio: 1.1) was used in place of the iron acetate. The TEM photograph of the obtained double-walled carbon nanotube (DWNT) is shown in FIG. 5.

Example 4

Figure 6:
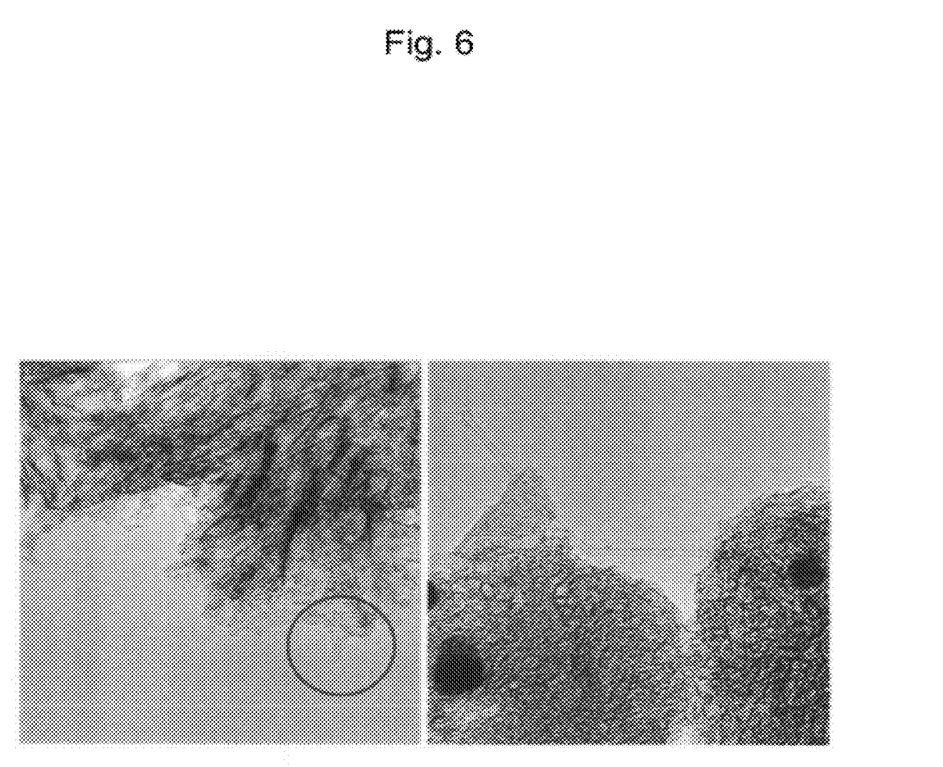
FIG. 6 is a TEM photograph (1 cm: 10 nm in the left-side drawing; 3 cm: 20 nm in the right-side drawing) of a product of Example 4.
Figure 7:
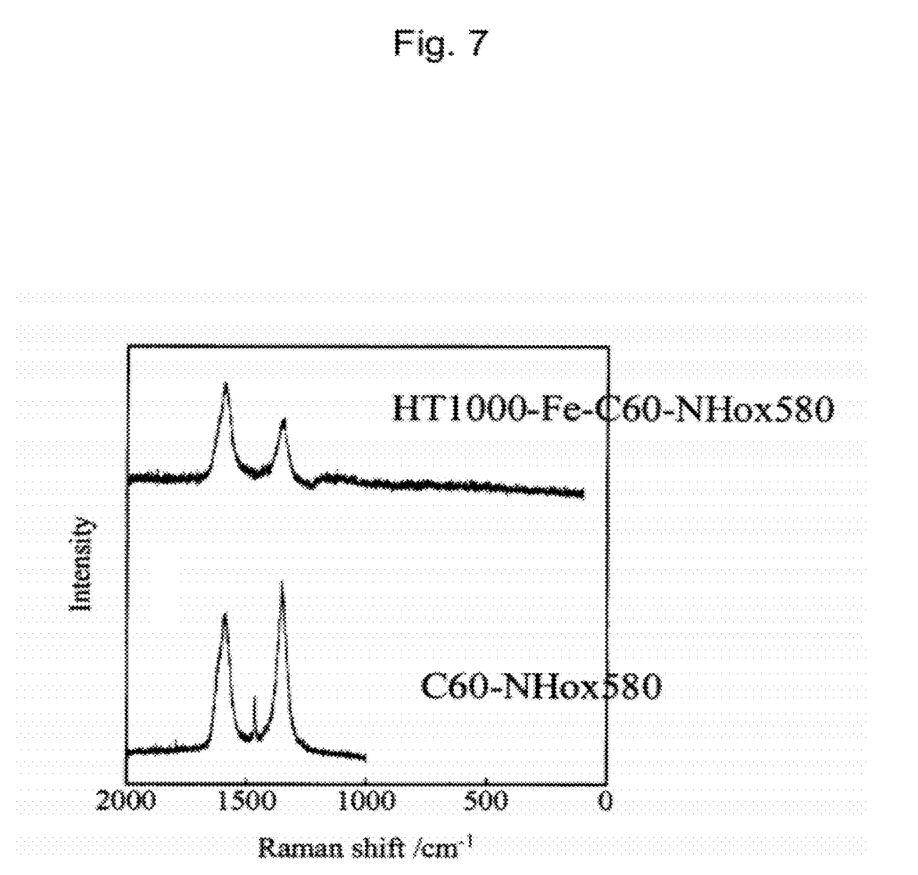
FIG. 7 is Raman spectra of the products of Example 4.

Prepared was NHox containing therein $C_{60}$ ($C_{60}$@NHox) (Preparation method: $C_{60}$ is dissolved in toluene, to which NHox is mixed. The toluene is then evaporated in a nitrogen stream). $C_{60}$@NHox was mixed with an ethanol solution of iron acetate. Using this mixture, iron acetate-carrying $C_{60}$@NHox was prepared in a manner similar to that of Example 1. The TEM photograph of $C_{60}$@NHox and iron acetate-carrying $C_{60}$@NHox is shown in the left side in FIG. 6. e iron acetate-carrying $C_{60}$@NHox was heated at 1,000° C. for 15 minutes in a stream of Ar (300 $cm^3$/min) to produce SWNT (right side in FIG. 6). The Raman spectrum of the obtained SWNT is shown in FIG. 7. The left-side drawing of FIG. 6 shows the TEM photograph of NHox containing therein iron acetate and $C_{60}$. Seen in the circle is $C_{60}$. The grayish particles in NHox are iron acetate particles. The right-side drawing of FIG. 6 shows the TEM photograph of the product after the heat treatment at 1,000° C. The produced SWNT having a diameter of 1 nm is seen.

FIG. 7 shows a Raman spectrum of the product obtained by heating the NHox containing therein iron acetate and $C_{60}$ at 1,000° C. (upper spectrum) and a Raman spectrum of $C_{60}$@NHox (lower specrum). In the lower spectrum, peaks attributed to the G and D bands and a peak (1,460 $cm^{-1}$) inherent to the $C_{60}$ contained inside NHox are seen. In the upper spectrum, the G band at near 1600 $cm^{-1}$ has a greater intensity than that of the D band at 1,350 $cm^{-1}$. This suggests that SWNT is produced. Because the amount of the produced SWNT is small, no breathing mode was observed.

Industrial Applicability

As will be appreciated from the foregoing description, since the nanohorns used as a carrier in the present invention is made of 100% carbon, it is easy to remove the carrier. Therefore, only a small burden is placed on the recovery and refinement of carbon nanotubes so that the production efficiency can be improved and process costs can be reduced.

Additionally, in the method of the present invention, when a solid carbon source (such as fullerenes and organic materials having a low vapor pressure) is included inside nanohorns or adhered on outer walls of nanohorns, it is possible to prepare nanotubes having a short length because the amount of the carbon source is small. The thus obtained short nanotubes may be used as an electron emitting element such as FED.

The invention claimed is:

1. A carbon nanohorn aggregate-carbon nanotube complex, wherein the carbon nanotube is terminated on the surface of the carbon nanohorn aggregate, wherein the complex comprises iron oxide particles, and wherein the length of the carbon nanotube is greater than the radius of the carbon nanohorn aggregate.

* * * * *